US009330231B2

(12) United States Patent
Feldmann et al.

(10) Patent No.: US 9,330,231 B2
(45) Date of Patent: May 3, 2016

(54) METHOD FOR DETERMINING A FLOW BEHAVIOR OF A MEDIUM

(71) Applicants: Rolls-Royce Deutschland Ltd & Co KG, Blankenfelde-Mahlow (DE); Rolls-Royce plc, London (GB)

(72) Inventors: Goetz G. Feldmann, Oberursel (DE); Kelvin Hau-Kong Chan, Singapore (SG)

(73) Assignees: Rolls-Royce Deutschland Ltd & Co KG (DE); Rolls-Royce PLC (GB)

( * ) Notice: Subject to any disclaimer, the term of this patent is extended or adjusted under 35 U.S.C. 154(b) by 840 days.

(21) Appl. No.: 13/677,555

(22) Filed: Nov. 15, 2012

(65) Prior Publication Data

US 2013/0124114 A1 May 16, 2013

(30) Foreign Application Priority Data

Nov. 15, 2011 (EP) .................................... 11189224

(51) Int. Cl.
| G01F 22/00 | (2006.01) |
| B24B 31/00 | (2006.01) |
| G06F 17/40 | (2006.01) |
| G06F 19/00 | (2011.01) |

(52) U.S. Cl.
CPC ................ G06F 19/00 (2013.01); B24B 31/00 (2013.01); G01F 22/00 (2013.01); G06F 17/40 (2013.01)

(58) Field of Classification Search
None
See application file for complete search history.

(56) References Cited

FOREIGN PATENT DOCUMENTS

| EP | 1 186 377 | 3/2002 |
| EP | 1 852 219 | 11/2007 |
| GB | 1 385 833 | 3/1975 |

OTHER PUBLICATIONS

European Search Report dated Apr. 18, 2012 from counterpart application.

*Primary Examiner* — Edward Cosimano
(74) *Attorney, Agent, or Firm* — Timothy J. Klima; Shuttleworth & Ingersoll, PLC

(57) ABSTRACT

A method for determining a flow behavior of a medium uses at least one analysis device placed inside the medium. The at least one analysis device is freely moveable in the medium and supplies data characterizing at least one property of the medium flow behavior to a data evaluation device. The at least one property of the medium flow behavior is determined by the data evaluation device on the basis of the data in selected areas or in all areas through which the at least one analysis device flows with the medium.

20 Claims, 3 Drawing Sheets

METHOD FOR DETERMINING A FLOW BEHAVIOR OF A MEDIUM

This application claims priority to European Patent Application EP11189224.6 filed Nov. 15, 2011 the entirety of which is incorporated by reference herein.

This invention relates to a method for determining a flow behavior of a medium having at least one analysis device placed inside the medium.

A variety of methods are known from actual practice for treatment of a surface of a component, with vibratory grinding, plunge grinding or ball polishing being used in particular. The respective component is, in the known methods, placed together with a processing medium inside a container, for example a drum or trough, with the medium, which in particular has a plurality of spherical metallic solid elements, being set in motion by a rotation of the drum relative to the component firmly connected to said drum. The surface of the component is processed by the individual solid elements due to this movement of the medium relative to the component.

In order to achieve a required surface condition of the component, it is important to know as precisely as possible the flow behavior of the medium during the surface processing operation. As is known, surface processing of the component with varying process parameters is performed in a very time-consuming empirical method and a check is made as to whether a condition of the component surface after processing conforms to the set requirements. If this is not the case, process parameters are altered and the processing result is reassessed.

Since a flow behavior of the medium, in particular in complex components, is difficult to simulate, optical recording systems are used to determine process parameters necessary to obtain a required surface quality of the component more quickly and easily and to better understand a flow behavior of the medium. With the visual methods, the flow behavior can be determined in areas in which particles of the medium move downwards and underneath a visible surface of the medium, or upwards to the surface of the medium, however a flow behavior of the medium underneath the visible surface of the medium can only be estimated from this data down to shallow depths, and movement of the medium in deeper areas cannot be determined.

For a further simplified determination of the medium flow behavior, it is known to colour-dye the medium during the surface processing operation. A movement direction and a velocity of the medium during the surface processing operation can be determined more easily in this way, and if necessary more exact information on the flow behavior of the medium can be obtained.

It is further known to place a kind of anchor in the medium in order to calculate, from the anchor movement as recorded by a video camera or from the link to the starting position fitted on the anchor, conclusions regarding a general velocity and direction of the medium flow.

Quantitative measurement results can, however, not be obtained for the entire flow behavior with this method, so that the flow behavior overall can only be determined very imprecisely. With the anchors used in the latter method, a flow behavior influenced by the anchor in the flow direction upstream of the anchor can also influence a flow behavior downstream of the anchor and so falsify the determined results.

Furthermore, methods are known from actual practice in which flow measurement devices are placed stationarily inside the medium and the flow behavior of the medium is determined at this position in the manner of a wind wheel. A statement as to the overall flow behavior can only be made with disproportionately heavy effort using these methods, with the flow behavior being possibly influenced by the flow measurement device and the measurement result being false. Furthermore, the flow behavior of the medium cannot be determined using these measurement devices in areas difficult to access if the space required for positioning the measurement device in these areas is insufficient.

The present invention, in a broad aspect, provides a method for determining a flow behavior of a medium, by which determination of said flow behavior of the medium can be achieved in a simple way.

A method is thus proposed for determining a flow behavior of a medium, having at least one analysis device placed inside said medium, where it is provided in accordance with the invention that the at least one analysis device is freely moveable in the medium and supplies data characterizing at least one property of the medium flow behavior to a data evaluation device with which the at least one property of the medium flow behavior is determined on the basis of said data in selected areas or in all areas through which the at least one analysis device flows with the medium.

A flow behavior of the medium, which may be of liquid, gaseous or solid form or a mixture thereof, can be determined very precisely and very simply with the method in accordance with the invention. This results from the fact that the at least one analysis device freely moveable inside the medium influences the flow behavior of the medium only slightly or not at all and hence the data evaluation is only slightly falsified or not falsified at all when compared to known methods with stationarily arranged analysis devices. In addition, with the method in accordance with the invention, a flow of the medium is possible even in areas not visible and which cannot be evaluated with visual methods, in particular in opaque media or in areas not visually accessible. Since the at least one analysis device moves freely with the medium, the flow behavior of the medium can also be determined in areas of the flow accessible with difficulty or not at all using conventional measurement methods.

The method in accordance with the invention can be used in particular for determining a flow behavior of a medium during surface processing of components, in particular by vibratory grinding, plunge grinding, ball polishing or the like. With methods of this type, the flow behavior of the medium can be determined even in areas not visible from the outside, e.g. when the medium during these processing methods is inside a closed container and is moved by rotation of the latter relative to the component, with the at least one analysis device also passing around the component multiple times during the process. Accordingly, the analysis device also passes, in the case of complex components such as blisk blades on individual disks or rotor, compressor components, turbine components, casings of aircraft engines and industrial gas turbines, through areas difficult to access in which the flow behavior of the appropriately suitable medium can thus be precisely determined in a simple manner. In addition to single-substance media, mixtures of spherical, cylindrical or satellite-shaped media and other geometrical forms of organic, polymer, metallic and non-metallic materials can be used, with and without admixture of abrasives and/or liquid.

The method in accordance with the invention is however not restricted to these applications and can in principle be used for determining any medium flow behavior. It is conceivable here that methods can be employed for determining a flow behavior in erosion situations, for quicksand or avalanches, and in general for fluid flows, flows with granular medium and the like.

In an advantageous design of the method in accordance with the invention, it is provided that the at least one analysis device has a locating unit by which a position of the at least one analysis device inside the medium can be determined and evaluated by the data evaluation device in order to determine at least one property of the medium flow behavior. For example, known Radio Frequency Identification (RFID) systems can be used here, where the at least one analysis device in particular has a transponder. The position of the at least one analysis device can here be determined both passively and actively by the data evaluation device.

With an advantageous method in accordance with the invention, the at least one analysis device has a transmitter unit by which data characterizing at least one property of the medium flow behavior is transmitted to a receiver device and evaluated by the data evaluation device to determine at least one property of the medium flow behavior. The data transmission between the transmitter unit of the at least one analysis device and the receiver device can operate using all known wireless transmission methods, for example Bluetooth or the like. It is advantageous here to evaluate the flow behavior of the medium "online" or "in time", thus conclusions can be drawn particularly quickly regarding the flow behavior of the medium.

In particular in ambient conditions where a transmitter/receiver system cannot be installed, it can be advantageous if the at least one analysis device has at least one memory unit in which data characterizing at least one property of the medium flow behavior is stored and which is evaluated by the data evaluation device to determine at least one property of the medium flow behavior, in particular after performance of the method.

Advantageously, the data characterizing the at least one property of the flow behavior relates to one position and/or one movement and/or one rotation and/or one acceleration of the analysis device and/or one pressure and/or one temperature in the area of the at least one analysis device. The flow behavior of the medium can be determined with particular precision, especially with a large amount of such data.

The data is determined in an advantageous embodiment of the method in accordance with the invention by at least one sensor of the at least one analysis device, where one position and/or one movement and/or one rotation and/or one acceleration of the at least one analysis device and/or one temperature and/or one pressure in the area of the at least one analysis device is determined using the at least one sensor. The use of pressure sensors is particularly advantageous, since the pressure in the medium varies depending on the poured level of the medium, which in turn has an effect on material removal and surface quality of a component to be processed.

If the at least one analysis device has several sensors, a plurality of data characterizing the properties of the medium flow behavior can be determined and the medium flow behavior can be assessed very precisely.

To influence the flow behavior of the medium either only slightly or not at all, the at least one analysis device substantially imitates a shape and size of particles forming the medium.

A time interval between times when data characterizing the flow behavior is determined is advantageously selected depending on a movement velocity of the medium.

The flow behavior of the medium can be determined particularly precisely if several, in particular a plurality of analysis devices, are placed inside the medium.

Process parameters leading to achievement of a required surface quality of components by a surface processing method can be determined particularly quickly if a result from the data evaluation device is used for setting process parameters of a following method.

The features stated herein are each suitable, either alone or in any combination with each other, to develop the subject-matter in accordance with the invention. The respective feature combinations do not represent any restriction as regards development of the subject-matter in accordance with the invention, but are substantially only exemplary in character.

Further advantages and advantageous embodiments of the method in accordance with the invention are described below.

FIG. 1 shows a highly simplified flow chart of a method in accordance with the invention for determining a flow behavior of a medium having at least one analysis device placed inside the medium and using the example of a ball polishing method for a blisk blade of a gas-turbine engine for an aircraft.

Figure 1:
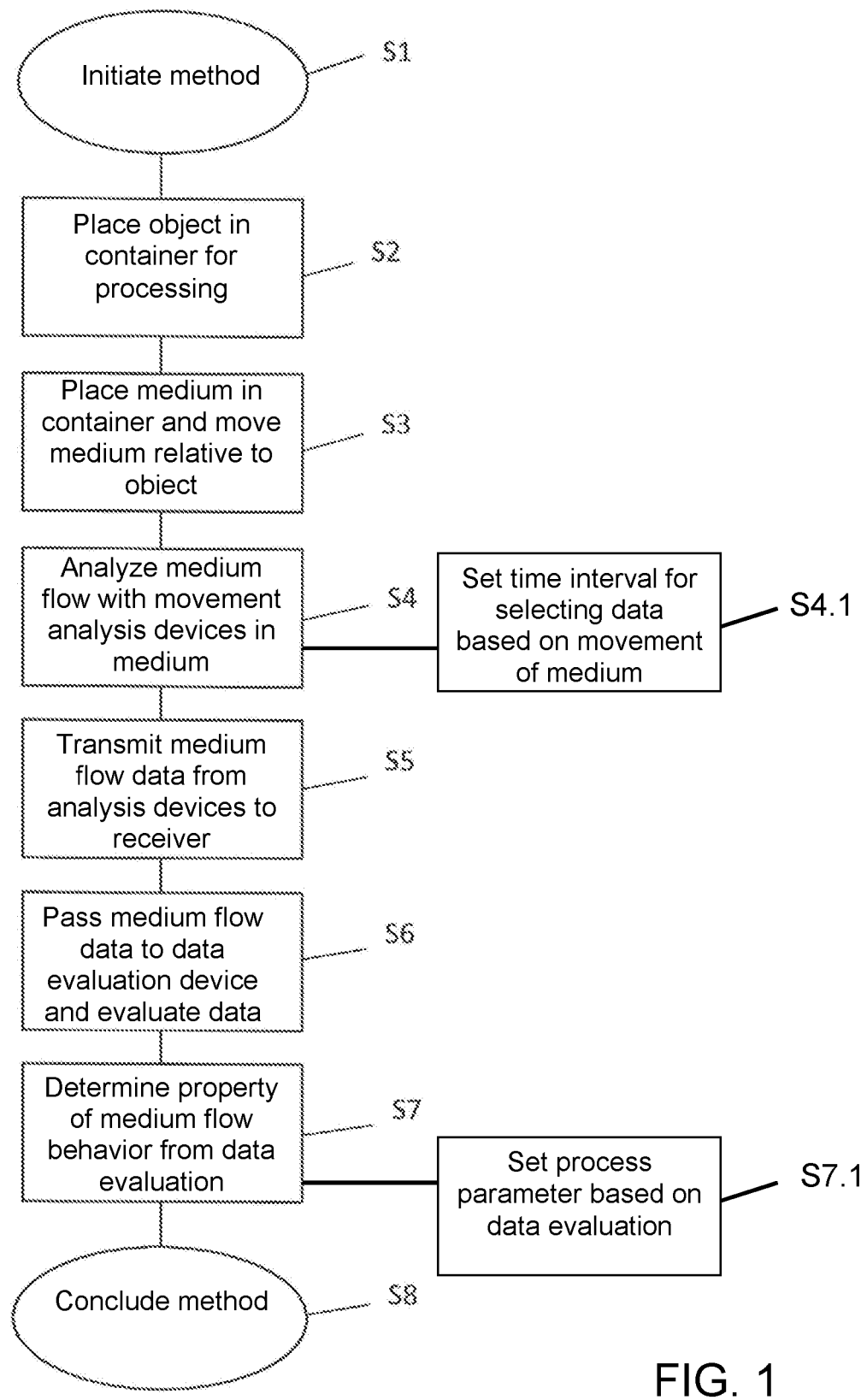
FIG. 1 shows a highly simplified flow chart of a method in accordance with the invention.
Figure 2:
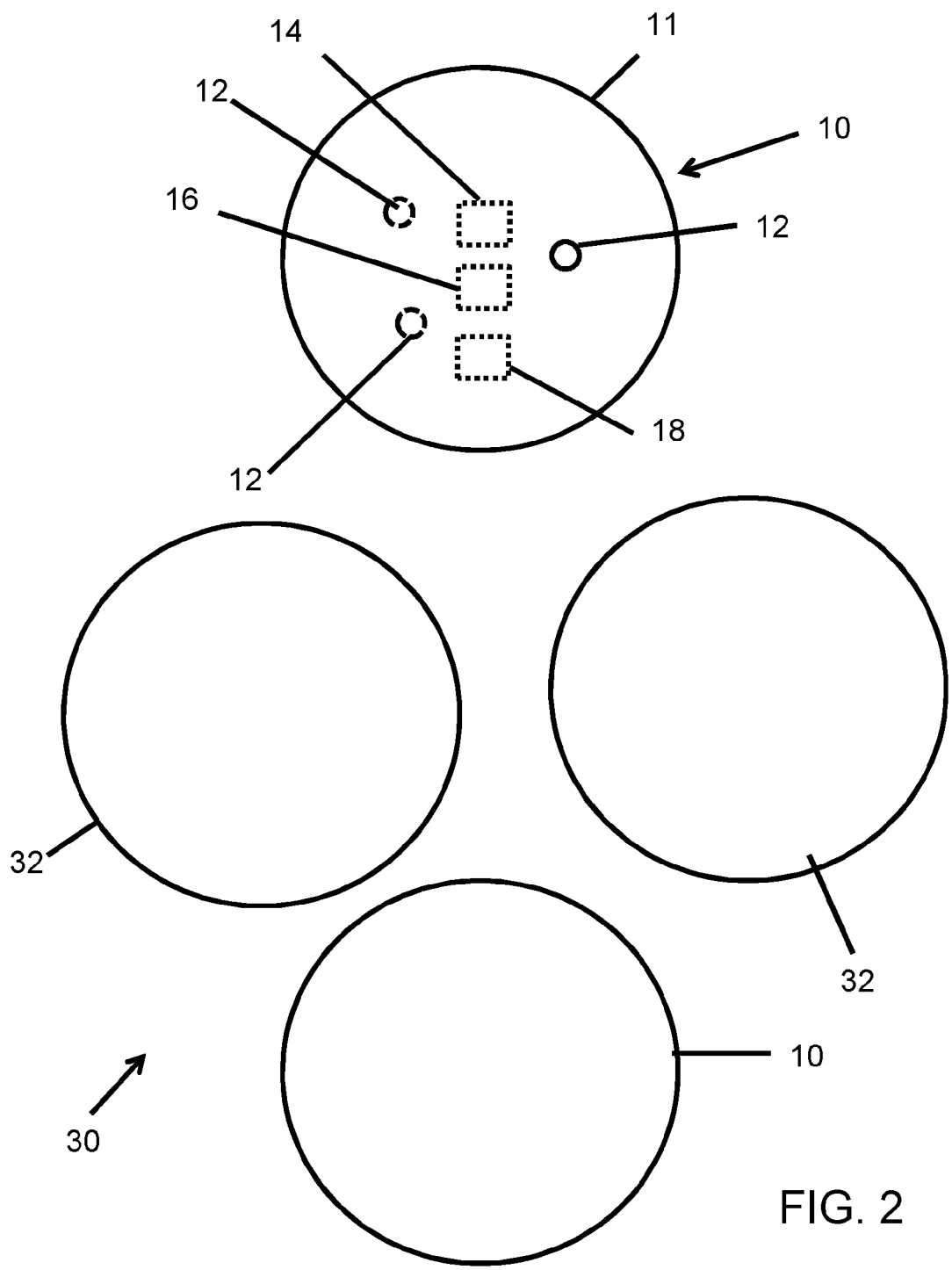
FIG. 2 shows a highly simplified schematic view of analysis devices in a medium used in the method of FIG. 1.
Figure 3:
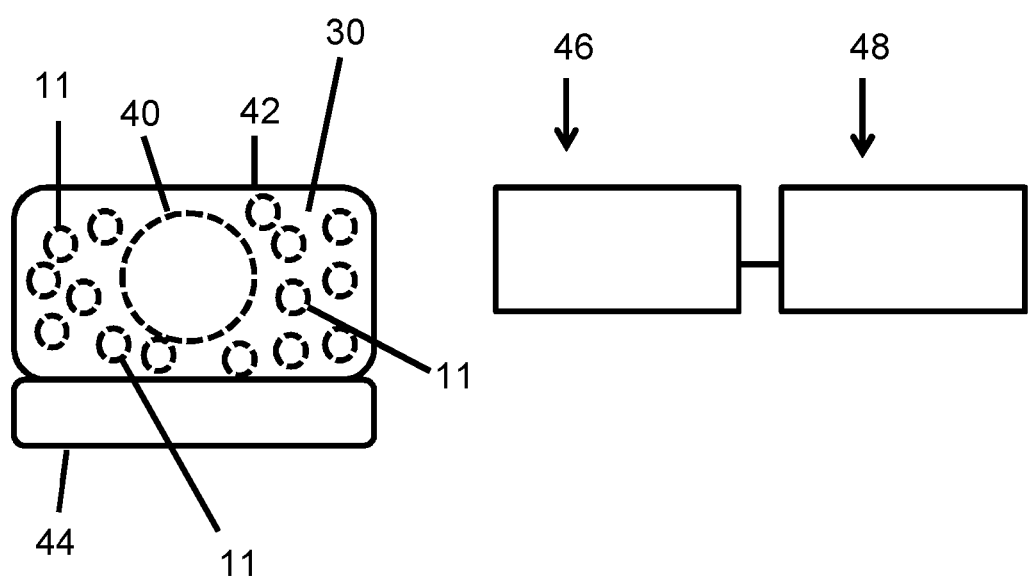
FIG. 3 shows a highly simplified schematic view of a system for performing the method of FIG. 1.

The method in accordance with the invention is initiated by a start block S1. A blisk blade 40 (see FIG. 3) of a gas-turbine engine is placed in a first process step S2 inside a container, a drum or a trough 42, for processing a surface of the blisk blade. In a further process step S3 for ball polishing of the surface, a plurality of, in this case, ball-shaped particles 32 (see FIG. 2) forming a medium 30, is put into the drum, said particles 32 being moved relative to the component, firmly connected to the drum, by a rotation and/or vibration of the drum excited by at least one motor 44. Due to the relative movement of the metallic, non-metallic, polymer or organic processing elements 32, which can also be designed in bar form or the like, the surface of the blisk blade is processed in a manner known per se.

To precisely determine a flow behavior of the medium 30 during surface processing and to adjust process and/or system parameters in order to obtain a required processing result, a plurality of analysis devices 10 is placed inside the medium 30 in a further process step S4. The analysis devices each have in this example a carrier structure 11, with a sensor 12 with six degrees of freedom being arranged therein in this case. The carrier structure 11 has material properties such that it can safely withstand the pressure acting on it and the temperatures prevailing during the process to ensure correct functioning of the sensors.

In their shape and weight, the analysis devices 10 are here likewise designed to be spherical and substantially match the polishing elements or balls 30 forming the medium 30 for surface processing of the blisk blade. During a movement of the balls 32 of the medium 30 relative to the blisk blade 40, a movement of the balls 32 of the medium 30 is influenced only slightly or not at all by the analysis devices 10 which can move freely inside the medium 30, i.e. without joining or permanently interacting with another element during the process.

The sensors 12 of the analysis devices 10, which are based for example on a triaxial accelerometer and a triaxial gyroscope, measure an acceleration acting on the respective analysis device and also an orientation of the analysis device 10 during its movement with the medium 30 through the drum 42. To do so, the triaxial acceleration sensor has in particular three linear acceleration sensors which are arranged relative to one another in the three spatial axes.

In a further process step S5, the data determined by the sensors is transmitted here "online" or "in time" to a receiver device 46 via a transmitter unit 14, in this case wireless, of the analysis device and in a subsequent process step S6 passed for data evaluation to a data evaluation device 48, in particular a computer. A transmission of the data from the transmitter unit 14 to the receiver device 46, in this case using a radio method, for example Bluetooth, can be performed using any wireless transmission methods.

Since the data can be transmitted from any position of the analysis devices 10 inside the drum 42 to the receiver device 46, the flow behavior of the medium 30 can also be analyzed and determined in areas provided underneath a medium surface visible from the outside. The analysis device 10 can also be provided with a memory unit 16 in which data characterizing at least one property of the medium flow behavior is stored and which is evaluated by the data evaluation device.

From the data passed on from the receiver device 46, the data evaluation device 48 determines in the known manner a position, velocity, acceleration and rotational movement of the analysis devices 10 in the medium 30. Since the analysis devices 10 have only a very slight influence or none at all on the flow behavior of the medium 30, the data evaluation device 10 can, in a further step S7, determine from this a property of the medium flow behavior at the positions inside the medium 30 which are passed through by the analysis devices 10. A flow behavior of the medium 30 and the causes for this flow behavior can thus be analyzed and conclusions can be drawn regarding the surface processing operation on the blisk 40 blades.

It can also be provided that further sensors 12, for example pressure sensors or temperature sensors, are arranged inside the carrier structure 11 of the analysis device 10 in order to determine further properties of the medium 30 flow behavior.

The sensors 12 of the analysis devices 10 determine the data, in one case, approximately every 0.1 seconds. The time interval between two measured data sets is selected in step S4.1 in particular depending on the velocity of the medium inside the drum 42 and on a required precision for determining the flow behavior of the medium 30, and can considerably differ from the present time interval, especially in other applications.

The transmission of the data from the transmitter units 14 of the analysis devices 10 to the receiver device 46 starts in particular before insertion of the analysis devices 10 into the medium 30, so that a position, determined by a locating unit 18, of the respective analysis device 10 in the drum 42 can be determined on the basis of a reference position at a later time by the data evaluation device 48.

By an evaluation of the data over a longer period of, for example, 15 to 60 minutes, the flow behavior of the medium 30 in all areas passed through by the analysis devices 10 can be evaluated and conclusions can be drawn from this regarding the surface treatment of the blisk blades 40. By using a plurality of analysis devices 10, for example 10 to 50, very precise information on the flow behavior of the medium 30 can be obtained. The individual analysis devices 10 can be placed inside the medium 30 at the start of the process at various heights of the drum 42.

The process sequence ends with the concluding step S8.

The information obtained in the method can be used for setting process parameters and/or system parameters (step S7.1), for example of a frequency of an unbalance motor 44 for excitation/operation of the drum, an amplitude of movement of the drum 42 by changing of weights or the like, in order to determine quickly those process parameters and/or system parameters by means of which the blisk blade 40 has a required surface quality and/or hardening in all areas after the surface treatment. This permits a component-related optimization of the process parameters, allowing a less expensive and/or more even and/or time-optimized treatment than with known methods. With the method in accordance with the invention, a parameter-related effect of the medium 30 can be analyzed.

What is claimed is:

1. A method for determining a flow behavior of a medium, comprising:
    placing at least one analysis device inside the medium, with the at least one analysis device being freely moveable in the medium;
    supplying data characterizing at least one property of the medium flow behavior from the at least one analysis device to a data evaluation device;
    determining with the data evaluation device the at least one property of the medium flow behavior, in a flow area through which the at least one analysis device flows with the medium, based on the supplied data characterizing the at least one property of the medium flow behavior.

2. The method of claim 1, and further comprising providing the at least one analysis device with a locating unit by a position of the at least one analysis device inside the medium is determined and evaluated by the data evaluation device to determine at least one property of the medium flow behavior.

3. The method of claim 1, and further comprising providing the at least one analysis device with at least one memory unit in which the characterizing data is stored and which, at a later time, is evaluated by the data evaluation device to determine the at least one property of the medium flow behavior.

4. The method of claim 1, and further comprising providing the at least one analysis device with a transmitter unit by which the characterizing data is transmitted to a receiver device and evaluated by the data evaluation device to determine the at least one property of the medium flow behavior.

5. The method of claim 1, and further comprising forming the at least one analysis device to substantially imitate a shape and size of particles forming the medium.

6. The method of claim 1, and further comprising setting a time interval between times when the characterizing data is selected depending on a movement velocity of the medium.

7. The method of claim 1, and further comprising using a result from the data evaluation device for setting a parameter of the method.

8. The method of claim 1, wherein the characterizing data relates to at least one chosen from a position of the at least one analysis device, a movement of the at least one analysis device, a rotation of the at least one analysis device, an acceleration of the at least one analysis device, a pressure in an area of the at least one analysis device, and a temperature in the area of the at least one analysis device.

9. The method of claim 8, and further comprising using at least one sensor of the at least one analysis device to determine the at least one chosen from the position of the at least one analysis device, the movement of the at least one analysis device, the rotation of the at least one analysis device, the acceleration of the at least one analysis device, the temperature in the area of the at least one analysis device, and the pressure in the area of the at least one analysis device.

10. The method of claim 1, and further comprising providing the medium for surface treatment of components including at least one chosen from vibratory grinding, plunge grinding and ball polishing.

11. The method of claim 10, and further comprising providing the at least one analysis device with a locating unit by a position of the at least one analysis device inside the medium is determined and evaluated by the data evaluation device to determine at least one property of the medium flow behavior.

12. The method of claim 11, and further comprising providing the at least one analysis device with at least one memory unit in which the characterizing data is stored and which, at a later time, is evaluated by the data evaluation device to determine the at least one property of the medium flow behavior.

13. The method of claim 12, and further comprising providing the at least one analysis device with a transmitter unit by which the characterizing data is transmitted to a receiver device and evaluated by the data evaluation device to determine the at least one property of the medium flow behavior.

14. The method of claim 13, wherein the characterizing data relates to at least one chosen from a position of the at least one analysis device, a movement of the at least one analysis device, a rotation of the at least one analysis device, an acceleration of the at least one analysis device, a pressure in an area of the at least one analysis device, and a temperature in the area of the at least one analysis device.

15. The method of claim 14, and further comprising using at least one sensor of the at least one analysis device to determine the at least one chosen from the position of the at least one analysis device, the movement of the at least one analysis device, the rotation of the at least one analysis device, the acceleration of the at least one analysis device, the temperature in the area of the at least one analysis device, and the pressure in the area of the at least one analysis device.

16. The method of claim 15, and further comprising providing the at least one analysis device with a plurality of sensors.

17. The method of claim 16, and further comprising forming the at least one analysis device to substantially imitate a shape and size of particles forming the medium.

18. The method of claim 17, and further comprising setting a time interval between times when the characterizing data is selected depending on a movement velocity of the medium.

19. The method of claim 18, and further comprising placing several analysis devices inside the medium.

20. The method of claim 19, and further comprising using a result from the data evaluation device for setting a parameter of the method.

* * * * *